United States Patent
Tredoux et al.

(10) Patent No.: US 9,400,879 B2
(45) Date of Patent: Jul. 26, 2016

(54) METHOD AND SYSTEM FOR PROVIDING AUTHENTICATION THROUGH AGGREGATE ANALYSIS OF BEHAVIORAL AND TIME PATTERNS

(75) Inventors: Gavan Leonard Tredoux, Penfield, NY (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1120 days.

(21) Appl. No.: 12/265,432

(22) Filed: Nov. 5, 2008

(65) Prior Publication Data

US 2010/0115610 A1    May 6, 2010

(51) Int. Cl.
G06F 15/16    (2006.01)
G06F 21/31    (2013.01)
H04L 9/32    (2006.01)

(52) U.S. Cl.
CPC ............ *G06F 21/316* (2013.01); *H04L 9/3231* (2013.01)

(58) Field of Classification Search
None
See application file for complete search history.

(56) References Cited

U.S. PATENT DOCUMENTS

| | | | | |
|---|---|---|---|---|
| 4,621,334 | A * | 11/1986 | Garcia | 382/115 |
| 6,256,737 | B1 * | 7/2001 | Bianco et al. | 713/186 |
| 6,430,549 | B1 * | 8/2002 | Gershfield et al. | |
| 6,810,480 | B1 * | 10/2004 | Parker et al. | 713/186 |
| 6,892,307 | B1 * | 5/2005 | Wood et al. | 726/8 |
| 7,039,951 | B1 * | 5/2006 | Chaudhari et al. | 726/7 |
| 7,206,938 | B2 * | 4/2007 | Bender et al. | 713/186 |
| 7,389,917 | B2 * | 6/2008 | Abraham et al. | 235/382 |
| 7,509,686 | B2 * | 3/2009 | Checco | 726/27 |
| 8,020,005 | B2 * | 9/2011 | Mani et al. | 713/182 |
| 8,051,468 | B2 * | 11/2011 | Davis et al. | 726/5 |
| 2005/0008148 | A1 * | 1/2005 | Jacobson | 380/26 |
| 2006/0280339 | A1 * | 12/2006 | Cho | 382/115 |
| 2007/0061590 | A1 * | 3/2007 | Boye et al. | 713/186 |
| 2009/0049544 | A1 * | 2/2009 | Kashi | 726/19 |

OTHER PUBLICATIONS

Sun OpenSSO Enterprise 8.0 Administration Guide, Sun, pp. 1-2, retrieved from http://docs.oracle.com/cd/E19316-01/820-3885/gimsp/index.html on Dec. 10, 2012.*
Guthrie, "The lie detective S.F psychologist has made a science of reading facial expressions", SFGate.com (Sep. 2002).
Kluger, "How to Spot a Liar", www.time.com (2008).
Schubert, "A Look Tells All", Scientific American Mind, www.sciam.com (Oct. 2006).
Ekman, "Cutting edge behavioral science for real world applications", www.paulekman.com (Nov. 2008).
Gladwell, "The Naked Face", Annals of Psychology, The New Yorker (Aug. 2002).
Rao, "Continuous Keystroke Biometric System", Media Arts and Tech., Univ. of CA (Sep. 2005).
Wachsmuth, "Gestures Offer Insight", Scientific American Mind, www.sciam.com (Oct. 2006).

* cited by examiner

*Primary Examiner* — Brandon Hoffman
(74) *Attorney, Agent, or Firm* — Fay Sharpe LLP

(57) ABSTRACT

A method and a system for evaluating identification of a user based on behavioral patterns and time patterns, including an analysis component for analyzing data; an authentication component for authenticating the analyzed data; and a behavioral biometric device for collecting behavioral biometric data related to the user, the authentication component and the analysis component operably connected at least with the behavioral biometric device; wherein the behavioral biometric data is matched against previously obtained or expected behavioral biometric data stored in a first database component of the analysis component in order to progressively, continuously, and incrementally evaluate the identification of the user to determine a confidence factor.

23 Claims, 6 Drawing Sheets

METHOD AND SYSTEM FOR PROVIDING AUTHENTICATION THROUGH AGGREGATE ANALYSIS OF BEHAVIORAL AND TIME PATTERNS

BACKGROUND

The present disclosure relates to authentication techniques, and more particularly, to a method and a system for identifying a user by observing, recording, and manipulating selective behavioral patterns and/or time patterns.

The introduction of electronic communications has demonstrated the need for security of all forms of data and communications exchange. Hackers have been able to perpetrate fraud and identification theft by intercepting communications, costing individuals and businesses around the world billions of dollars. In many cases, fraud has been executed even when encryption systems are part of the system architecture. Thus, strong and dynamic authentication is needed to ensure non-repudiation of an entity requesting access to sensitive information or for executing privileged transactions.

One method used for identifying a user is based on a secret identification code, also referred to as a PIN (Personal Identification Number) or password. In such a system, a user enters a PIN code or a password on a transaction terminal, which then transfers the entered PIN code to, for example, a chip card or other memory device, which checks the PIN code or password by comparing it with a reference PIN code or password. The security of such a system is guaranteed by the fact that the reference PIN code or password is stored within the chip card or memory device, which is inherently protected. However, the drawbacks of such a system include at least the fact that another individual can commit fraud by stealing this "secret" PIN code or password. Unfortunately, such methods for authorizing transactions or for controlling access can be easily compromised. Account numbers, passwords, PIN codes, etc. can be discovered by non-authorized persons or can be willingly disclosed by authorized users to non-authorized persons.

As traditional forms of personal identification become vulnerable to advancing technology, biometric identification has been increasingly seen as a viable approach to security of personal identification. Biometrics consists of acquiring, measuring and recognizing physical characteristics of a user. Biometrics makes it possible to directly identify a user whilst the PIN code or password method allows indirect identification by the fact of checking that the user knows a "secret." Amongst the known techniques in physical biometrics, there are the methods of recognizing voice characteristics, characteristics peculiar to the shape of the face or to the iris of the eye or, in the most frequent case, fingerprint characteristics.

Biometric systems typically comprise an automated system having one or more biometric input devices capable of capturing a biometric sample from a user, extracting biometric data from the sample, comparing the biometric data with that contained in one or more reference templates, determining whether a match exists, indicating whether verification of identity has been achieved, and triggering an event based on the verification. Therefore, biometric access control systems are used to selectively restrict and/or permit access to various areas within a facility by requiring a biometric match and confirmation of access authorization prior to facilitating access.

The existing biometric identity check systems can be broken down into three phases.

The first phase is a phase of capturing biometric data from a sensor. The acquired biometric data are usually images, for example in the case of fingerprints, iris or face shape. However, it can also be a case of sound sequences in the case of voice recognition. The second phase is an analysis or extraction phase for extracting a biometric signature from biometric data captured during the first phase. This second phase is complex and requires high calculation power. The third phase consists of comparing the biometric signature obtained during the second phase with a reference signature defined previously during a procedure called "enrolling."

Additionally, various token-based biometric technologies also exist. These suggest using smart cards, magnetic swipe cards, or paper checks in conjunction with fingerprints, hand prints, voice prints, retinal images, facial scans or handwriting samples. Biometrics are generally either stored in electronic and reproducible form on the token itself, or used in tandem with the user directly using magnetic swipe cards, paper checks or a PC (Personal Computer).

However, even physical biometric systems and token-based biometric technologies can be compromised by hackers. The present disclosure is intended to overcome the drawbacks of these physical biometric methods by exploiting a class of behaviors (e.g., behavioral biometrics) employed to identify a user. In particular, the present disclosure relates to a system and method for identifying a user by observing, recording, and manipulating selective behavioral patterns and time patterns. The present disclosure further relates to progressively evaluating the identification of a user by using behavioral cues.

SUMMARY

The present disclosure provides a system for evaluating identification of a user based on behavioral patterns and time patterns, including an analysis component for analyzing data; an authentication component for authenticating the analyzed data; a behavioral biometric device for collecting behavioral biometric data related to the user, the authentication component and the analysis component operably connected at least with the behavioral biometric device; wherein the behavioral biometric data is matched against previously obtained or expected behavioral biometric data stored in a first database component of the analysis component in order to progressively, continuously, and incrementally evaluate the identification of the user to determine a confidence factor.

The present disclosure also provides a method for evaluating identification of a user based on behavioral patterns and time patterns, including the steps of analyzing data; authenticating the analyzed data; and collecting behavioral biometric data related to the user; wherein the behavioral biometric data is matched against previously obtained or expected behavioral biometric data in order to progressively, continuously, and incrementally evaluate the identification of the user to determine a confidence factor.

The present disclosure also provides for a computer-readable medium storing a set of programmable instructions configured for execution by at least one processor for evaluating identification of a user based on behavioral patterns and time patterns, including the steps of analyzing data; authenticating the analyzed data; and collecting behavioral biometric data related to the user; wherein the behavioral biometric data is matched against previously obtained or expected behavioral biometric data in order to progressively, continuously, and incrementally evaluate the identification of the user to determine a confidence factor.

BRIEF DESCRIPTION OF THE DRAWINGS

Various embodiments of the present disclosure will be described herein below with reference to the figures wherein.

DETAILED DESCRIPTION

Figure 1:
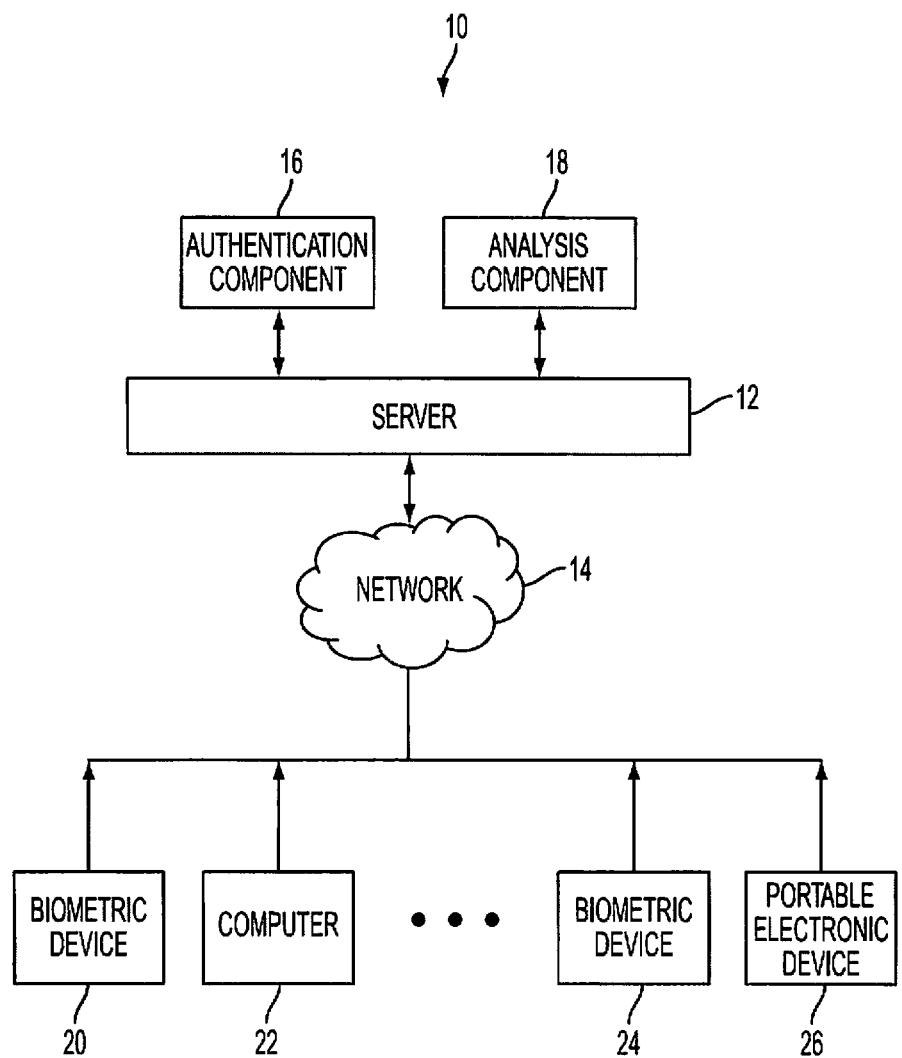
FIG. 1 is a block diagram depicting a system for evaluating identification of a user based on behavioral patterns and time patterns, in accordance with the present disclosure.

The present disclosure proposes a system and a method for progressively evaluating the identification of an individual by using behavioral cues or patterns. For example, when an individual attempts to access a computing device, then authentication is generally performed by using a challenge-response or physical biometric data collecting device. Successful validation establishes the identity of the user. However, validation can be defeated by an unauthorized user who may compromise the physical biometric data. Instead, by analyzing user interactions over time patterns and behavioral patterns that are distinct to a particular individual (behavioral biometrics), effective validation can be achieved. The present disclosure seeks to capture these behavioral or time-sensitive actions by an individual and use such actions continuously, progressively, and incrementally to reevaluate an individual's identity and establish a confidence factor in the identity of the individual. This information can then be effectively used to grant or revoke privileges of this particular individual.

The present disclosure is also based on the recognition of two concepts. One concept is that there typically is not a single level of authorization for all services, applications and/or resources, but rather that some services, applications and/or resources should be more restricted than others. The second concept is that a user's trustworthiness may not be established to a certainty, but rather to some degree of probability. In other words, an unknown user can be initially provided with the services, applications and/or resources that do not require authorization. As a degree of trust is established, the services, applications and/or resources are progressively authorized to the appropriate level. While trustworthiness need not be linked to identity, it could be calculated as the product of the likelihood of the user's identity times the authorization profile of that person.

The present disclosure further proposes that a class of behaviors that could be used to identify a user be a preference profile or user profile for user interface redundancies. In addition, the present disclosure describes how such behaviors can be measured by monitoring and enumerating the redundant operations and constructing a profile of the user's preferences that can be compared against a profile of current or expected user behavior.

The present disclosure is further based on the recognition that certain measures of a user's involuntary behavior can yield an identity characteristic and that measuring characteristics over time can provide a measure of incremental confidence as to their identity. In other words, a user may be authenticated to use services, applications, and/or resources utilizing any well-known current or future authentication scheme. As the user exercises these services, applications and/or resources, the system can measure behavior. By comparing current with past or expected usage behavior, the system can judge or determine the identity of the user with increasing confidence.

Therefore, according to the present disclosure, biometrics can be categorized into two categories. There are physical biometrics and behavioral biometrics. Physical biometrics focus on biological or physiological characteristics of a user. For example, physical biometrics are used within computer science to identify users based upon such characteristics as body odor, ear shape, face recognition, finger geometry, finger image, hand geometry, iris recognition, retina recognition, voiceprint recognition, blood analysis, genetic sampling, and the like. In contrast, a behavioral biometric is characterized by a behavioral trait that is learned and acquired over time rather than a physiological characteristic. Behavioral biometrics can be based on keystroke dynamics, signature verification, mouse movement and trajectory dynamics, speaker verification, GUI (Graphical User Interface) selection dynamics, web page navigation dynamics, user response time characteristics, eye focus, content consumption preferences, and the like. Behavioral biometrics can be used to determine an identity of a user, a mood of a user, and content a user is focusing upon. Behavioral biometrics can also be used to infer profile characteristics of a user without requiring the user to explicitly enter such information. The present disclosure focuses on using behavioral biometrics to overcome any drawbacks presented by physical biometrics.

Embodiments will be described below while referencing the accompanying figures. The accompanying figures are merely examples and are not intended to limit the scope of the present disclosure.

With reference to FIG. 1, there is presented a block diagram depicting a system for evaluating identification of a user based on behavioral patterns and time patterns, in accordance with the present disclosure. The block diagram 10 includes a server 12, a network 14, an authentication component 16, and an analysis component 18. The network 14 is connected to a first biometric device 20, a computer 22, a second biometric device 24, and a portable electronic device 26.

The server 12 is a system for storing data. The server 12 can be any type of server envisioned by one skilled in the art. For example, the server 12 can be an application server, a communication server, a database server, a web server, a proxy server, a client server, and/or a combination of any of the above.

The network 14 may be any type of known network including, but not limited to, a wide area network (WAN), a local area network (LAN), a global network (e.g. Internet, cellular), a virtual private network (VPN), and an intranet. The network 14 may be implemented using a wireless network or any kind of physical network implementation. Any type of user system (e.g., 20, 22, 24, 26) may be coupled to a host system or a network interface (not shown) through multiple networks (e.g., intranet and Internet) so that not all user systems are coupled to the host system through the same network. Moreover, one or more of the user systems (e.g., 20, 22, 24, 26) may be connected to the network 14 in a wireless fashion.

The authentication component 16 is in communication with the server 12 and the network 14. A network interface may interface with network 14, thus facilitating authentication component 16 to be in operative communication with the network 14. Authentication component 16 will be further described below with reference to FIG. 3. However, the term "authenticate" refers to data authentication. Data authentication can be any process used to verify data integrity, for example, verification that data received are identical to data sent. Data authentication can also refer to any security measure designed to protect a communications system against fraudulent transmissions and establish the authenticity of a message. Data authentication can also refer to a way to ensure users are who they say they are, for example, that the user who attempts to perform functions in a system is in fact the user who is authorized to do so. A computer system supposed to be used only by those authorized must attempt to detect and exclude the unauthorized. Access to it is therefore usually controlled by insisting on an authentication procedure to establish with some established degree of confidence the identity of the user, thus granting those privileges as may be authorized to that identity.

The analysis component 18 is in communication with the server 12 and the network 14. A network interface may interface with network 14, thus facilitating analysis component 18 to be in operative communication with the network 14. Analysis component 18 may also be configured analyze behavioral biometric data to derive behavioral patterns and/or time patterns related to user identification. Analysis component 18 will be further described below with reference to FIG. 2. However, the term "analyze" refers to data analysis. Data analysis can be broadly defined as the systematic study of data so that its meaning, structure, relationships, origins, etc. are understood. Data analysis can also refer to the process of systematically applying statistical and logical techniques to describe, summarize, and compare data. Data analysis can further be described as systematically identifying patterns in the information gathered and deciding how to organize, classify, interrelate, compare, and display it. In addition, data analysis can be defined as the process by which data are organized to better understand patterns of behavior within the target population.

Moreover, in regards to FIG. 1, a user identity can be determined to a degree of confidence by examining some natural involuntary behavior of the user. Since this behavior is involuntary it has several advantages over other identification methods, such as PIN code or password protected methods. In addition, tracking behavioral cues or patterns has advantages over identifying tokens which must be guarded by the user. For instance, behavioral patterns are difficult to reveal and cannot be misplaced or lost, since the user is not consciously aware of such behaviors. If the analysis is aggregated from multiple measures it is difficult to deliberately emulate the behavior through casual observation or interrogation of, for example, a hostage. Consequently, a system based on behavioral cues or a pattern (or even timing patterns) is difficult to defeat by hackers or other unauthorized users.

Suspicion based on behavioral analysis may be used to revoke authentication, raise alarms, or trigger further investigation by other alternative methods. Although it is conceivable that this behavioral biometric analysis could replace traditional authentication techniques in certain scenarios, given a pre-established set of user profiles, this is not the primary purpose of the present disclosure. One purpose of the present disclosure is to augment any current or future scheme for authentication used to initially provide confidence in identity of a user.

There are many kinds of measures that can be used, including: textual style and other characteristics of the raw stream of text generated by the user, user interface preferences when editing and navigating, file-naming patterns, file system browsing habits, web URLs (Uniform Resource Locators) habitually visited, system or software application usage, and/or keystroke dynamics or any preferable combination of the above.

Referring to textual style and other characteristics of the raw stream of text generated by the user, the raw uncorrected stream of text is particularly suitable because edited text narrows down the range of alternatives. Raw text includes a broader range since it includes misspellings and grammatical errors before they are corrected, and captures other elements of compositional style that are lost from a finished product, such as a document. By treating the text as a stream rather than a document or set of documents, a richer source of idiosyncrasies is available. This overcomes a principal difficulty faced by document forensics, which is the narrowed range of texts available for analysis, and the presence of standard finished compositional forms (e.g., haiku, sonnets, romance novel, rhetoric, office memo), which complicates distinction between individual authors.

Referring to user interface preferences when editing and navigating, popular user interfaces provide multiple ways of performing the same task, for example, keystroke shortcuts versus pointer-driven menus. Different users have different preferences for such tasks.

Referring to file-naming patterns, users have characteristic preferences for the names they give to files, most primitively the length of name but also other features such as use of hyphens versus underscores, spaces and the like.

Referring to file system browsing habits, when opening or saving files, users have characteristic ways of "drilling down" through a file system. Users may use shortcuts, or always start from the top level. User never use or always use, their personal folder, and so on.

Referring to web URLs habitually visited, users tend to visit a regular set of URLs, often in a characteristic order, at different times of the day. For example, users may check certain news sites when first logging on, or at lunchtime, or prefer to use news aggregators.

Referring to system or software application usage, as with web URLs, users may prefer certain software applications, possibly during different periods of the day. More fundamentally, users have certain times when they are most active, and other times when users are least active, as when some people habitually take lunch and others do not, or only on certain days.

Referring to keystroke dynamics, the timing and accuracy of keystroke typing is characteristic of individuals.

The above list of behavioral measures or cues or patterns is intended to be representative and not exhaustive. Many other measures may be available. The present disclosure proposes only to use whichever aspects of behavior prove to be suitable, given that both proven and plausible candidates are already available. This can be established empirically given a specific user population and domain of implementation. The measures suitable for high-security government environments may differ from those suitable for more mundane office settings, and may also be culture specific. The present disclosure proposes that a large pool of measures be weeded out over time by continuous reliability measurement, in the same way that psychometric tests are modified over time, though not manually, as in that case, but rather automatically.

Such individual measures may vary in test/retest reliability and supply different levels of confidence in identity. While no one measure on its own may provide the level of confidence needed, the various measures can be aggregated to provide high composite reliability. This follows the same principle used when constructing psychometric tests from items with lower individual reliability, and similarly the use of aggregation in statistical meta-analysis to cancel out random sampling error. Well known statistical methods, such as the Mahalanobis distance for a multivariate norm, can be used to combine the measures. However, one skilled in the art will appreciate that any type of statistical method may be utilized depending on the desired applications envisioned.

Finally, while a process carried out on a system such as a workstation to establish user identity has been described, a process could be developed to be used for remote interactions and could be individually applied to particular resources. For example, a service that is available remotely through the internet, or some other network, might independently monitor its interactions with a remote user and establish its own user identification confidence, without regard to what is established at the remote workstation.

Figure 2:
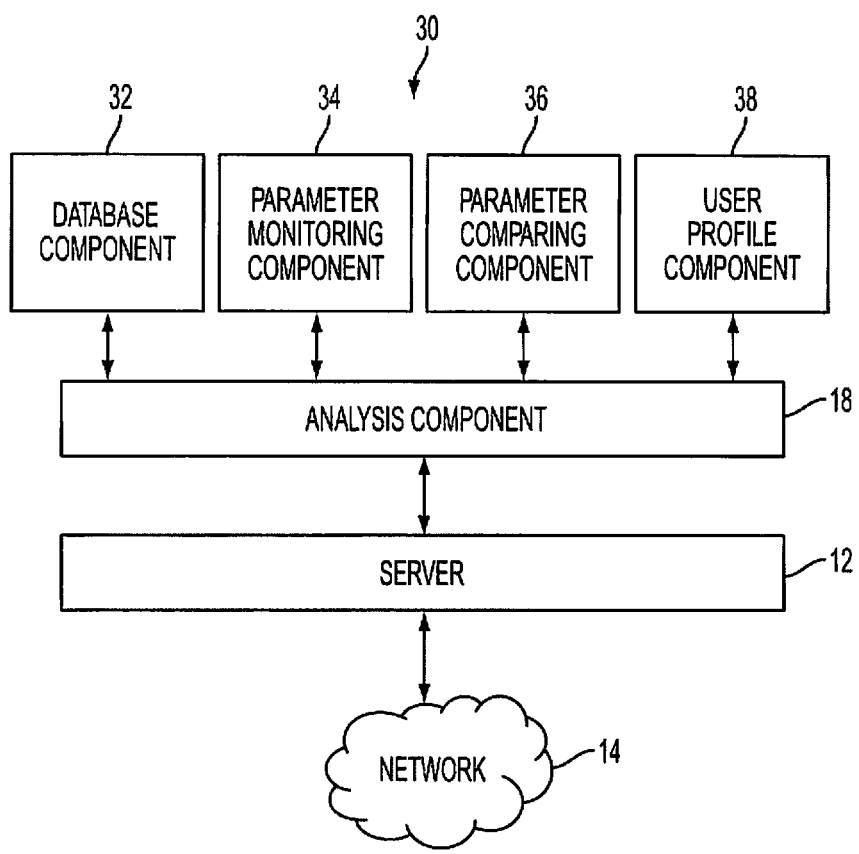
FIG. 2 is a block diagram depicting an analysis component for analyzing behavioral patterns and time patterns, in accordance with the present disclosure.

With reference to FIG. 2, there is presented a block diagram depicting an analysis component for analyzing behavioral patterns and time patterns, in accordance with the present disclosure. The block diagram 30 includes a server 12, a network 14, and an analysis component 18. The analysis component 18 includes a database component 32, a parameter monitoring component 34, a parameter comparing component 36, and a user profile component 38.

The server 12 and the network 14 have been described above with reference to FIG. 1.

The database component 32 may be implemented using a variety of devices for storing electronic information. It is understood that the database component 32 may be implemented using memory contained in the network interface, user systems (e.g., 20, 22, 24, 26), or it may be a separate physical device. The database component 32 is logically addressable as a consolidated data source across a distributed environment that includes the network 14. Information stored in the database component 32 may be retrieved and manipulated via the network 14 and/or via one or more user systems (e.g., 20, 22, 24, 26).

The parameter monitoring component 34 monitors one or more behavioral patterns and/or timing patterns of a user. The parameter monitoring component 34 may monitor mouse movement, keyboard interactions, time spent viewing a document or a web site, the type of content, etc. As one or more parameters are being monitored progressively, continuously, and/or incrementally, the parameter monitoring component 34 send such data to the parameter comparing component 36.

The parameter comparing component 36 may compare behavioral patterns and/or timing patterns of a user against a plurality of previously established and/or expected behavioral patterns and/or timing patterns. The previously established behavioral and timing patterns can include user-specific patterns and/or user-agnostic behavioral patterns. The parameter comparing component 36 may determine whether the user is in his or her usual mood or in an abnormal mood or determine whether the user is a different individual from the registered user.

The user profile component 38 creates a user profile for every user utilizing the system. The user profile component 38 may establish, update, and maintain user-specific profiles of behavioral biometric data. This information may be provided back to the parameter comparing component 36 for further analysis.

The present disclosure includes a set of behavior monitors that continuously, progressively, and/or incrementally observe the user during his or her interaction with the system, and a profile developed over time for the user, which contains a dynamic measure of previously monitored and/or expected behavior measures.

The analysis component 18 compares the observed and/or expected values and provides a probability for the user's identity, where the initial identity is established through a traditional authentication scheme. As the user utilizes the system, more and more data is collected by the analysis component 18, and confidence in the values from the behavior monitors increases. The present disclosure is based on detecting marked deviations in the future from such well-established behavior patterns or timing patterns.

Many usage behavior measures are amenable for analysis and comparison when they have an idiosyncratic component (e.g., specific to the individual). If choices are arbitrary then they are unpredictable per se, but the natural tendency of humans to form habits and make the same arbitrary choices over time, and the presence of built-in predispositions or prejudices to make some choices rather than others, allows probabilistic inference from an observed pattern to user identity, with the probability increasing as more data is available.

Figure 3:
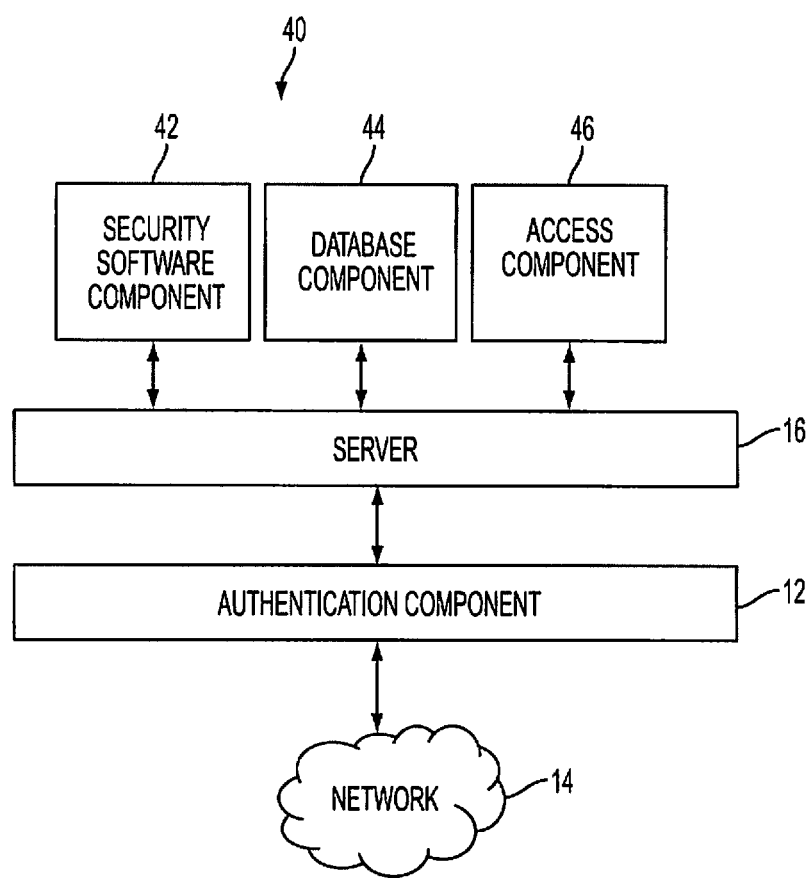
FIG. 3 is a block diagram depicting an authentication component for authenticating behavioral patterns and time patterns, in accordance with the present disclosure.

With reference to FIG. 3, there is presented a block diagram depicting an authentication component for authenticating behavioral patterns and time patterns, in accordance with the present disclosure. The block diagram 40 includes a server 12, a network 14, and an authentication component 16. The authentication component 16 includes a software security component 42, a database component 44, and an access component 46.

The server 12 and the network 14 have been described above with reference to FIG. 1.

The software security component 42 includes user authentication software for aiding in the authentication of users. One skilled in the art can use any type of user authentication software available. Additionally, the software security component 42 aids in prompting the access component 46 (described below) to deny access to a user, to limit access for a user to certain applications and/or resources, to prompt the user for additional information, to inform the parameter monitoring component 34 of suspicious activity, to log suspicious activity in the database component 44 (described below), and/or to further evaluate current user profiles with the aid of the user profile component 38.

The database component 44 may be implemented using a variety of devices for storing electronic information. It is understood that the database component 44 may be implemented using memory contained in the network interface, user systems (e.g., 20, 22, 24, 26), or it may be a separate physical device. The database component 44 is logically addressable as a consolidated data source across a distributed environment that includes the network 14. Information stored in the database component 44 may be retrieved and manipulated via the network 14 and/or via one or more user systems (e.g., 20, 22, 24, 26).

The access component 46 permits or denies access of a user based on the behavioral biometric data collected and analyzed via the analysis component 18. Suspicion based on behavioral analysis may be used to revoke authentication, raise alarms, or trigger further investigation by other alternative methods. The access component 46 aids in the execution of one or more of these commands and is in operable communication with the software security component 42.

Figure 4:
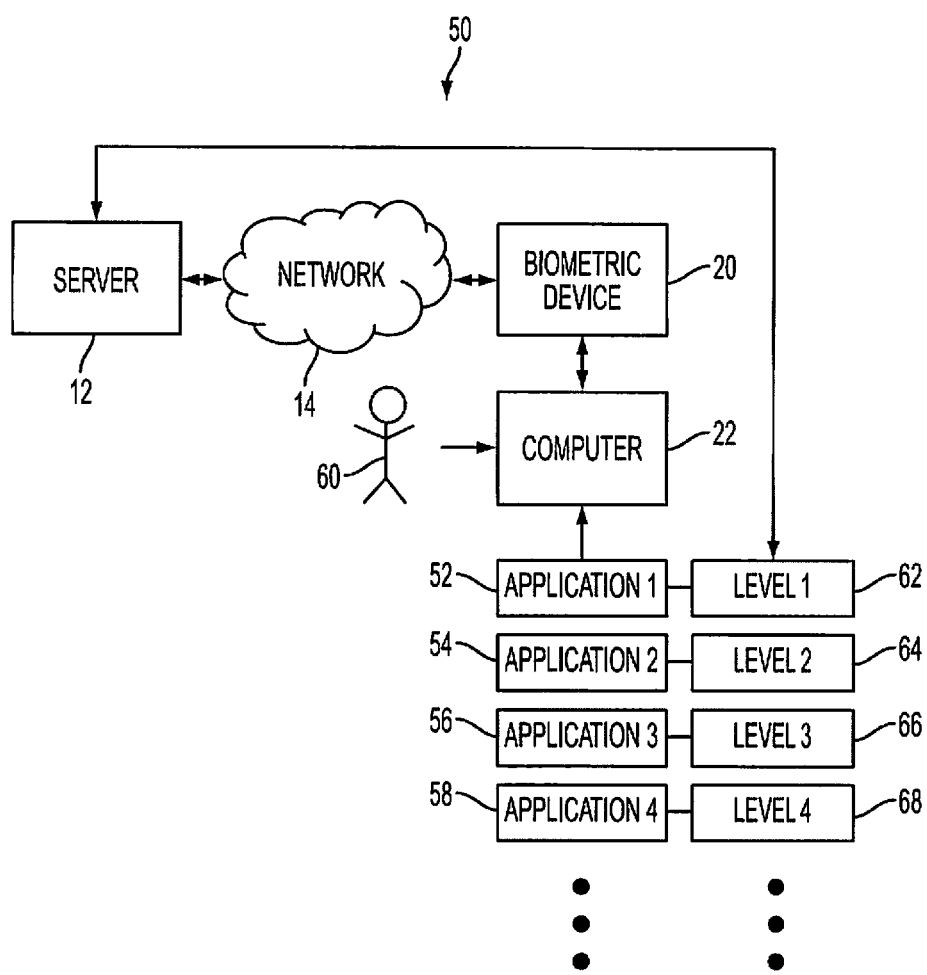
FIG. 4 is a block diagram depicting a system for evaluating the different security classification levels of one or more applications or resources or services, in accordance with the present disclosure.

With reference to FIG. 4, there is presented a block diagram depicting a system for evaluating the different security classification levels of one or more applications or resources, in accordance with the present disclosure. The block diagram 50 includes a server 12, a network 14, a biometric device 20, a computer 22, and a user 60. The computer 22 may include a first application 52, a second application 54, a third application 56, and a fourth application 58. The first application 52 may be set to a first security classification level 62. The second application 54 may be set to a second security classification level 64. The third application 56 may be set to a third security classification level 66. The fourth application 58 may be set to a fourth security classification level 68.

The server 12 and the network 14 have been described above with reference to FIG. 1.

The applications 52, 54, 56, 58 may be any type of software that is a subclass of computer software that employs the capabilities of a computer directly and thoroughly to a task that the user wishes to perform, such as word processor software, spreadsheet software, web software, media player software, etc.

The security classifications levels 62, 64, 66, 68 are different predetermined access levels for each of the applications 52, 54, 56, 58. For example, first application 52 may have a first classification level 62 and second application 54 may have a second classification level 64. The first classification level 62 may allow the user to access every aspect of the first application 52, whereas the second classification level 64 may allow the user to access only certain aspects of the second application 54. In other words, the system 50 recognizes that various resources, services, and/or applications may require different levels of authorization. For example, it may be acceptable for any guest user to browse the internet (e.g., the third application 56), but only certain users should be granted access to a particular file directory (e.g., the fourth file application 58). Some users may have read access to a document, but modifying the document may be restricted to the author. In addition, various features of a software application may be available only to corresponding license holders. The dangers or ramifications of exposing a service, resource, and/or application to an unauthorized user can vary. As a result, security classification levels (e.g., 62, 64, 66, 68) are defined.

These levels (e.g., 62, 64, 66, 68) of authorization should be keyed to the degree of trust one has in the user. If the user is untrustworthy, then what such users are allowed to do should be restricted to limit any possible malicious damage. The authorization can also be linked to the user's role. If a user has no need of sensitive information or to carry out a hazardous function, then such user should be prevented from doing so, even though they may be trustworthy, simply because there is no need to take chances. Note that trustworthiness and role are different from the user's identity, although they are often linked. One might establish trust without knowing who the user is (e.g., by watching their behavior, or receiving a recommendation from a trusted source). One might also establish a role without knowing the identity (e.g., by noting the device or application being used).

In the present disclosure, it is recognized that the trustworthiness of a user is rarely a hard certainty. Instead, it is a value for which one has some degree of confidence. Furthermore, it may be possible to revise (e.g., increasing or decreasing) the degree of confidence with time. If trust is established by watching the user's behavior, then the longer the system watches, the greater the system's confidence in the user. If the system is relying on recommendations, then the system may gather additional recommendations or may establish greater trust in the recommending agent.

One purpose of the present disclosure is to match a user's access to resources or application features to the current level of trust, and furthermore, to allow that level of access to automatically vary with an increasing or decreasing degree of confidence. Another purpose of the present disclosure is to link the level of authorization to the degree of confidence in the user's trustworthiness, which often corresponds to the confidence in their identity. Thus there is a mechanism for mapping the authorization requirements for each resource, service, and/or application to the trustworthiness of the user, and the degree of confidence in that identification. For example, an unknown or unverified user might be severely limited in what he or she is permitted to perform. A user who has established his or her identity would have access to all the resources that he or she is authorized. Thus a user could begin working on a workstation without having to enter a password, but could only exercise certain safe operations. If the device has a mechanism to identify users through their behavior, then the user may continue to use the device, and the device develops confidence in their identity and over time more and more resources would become authorized to such user.

Figure 5:
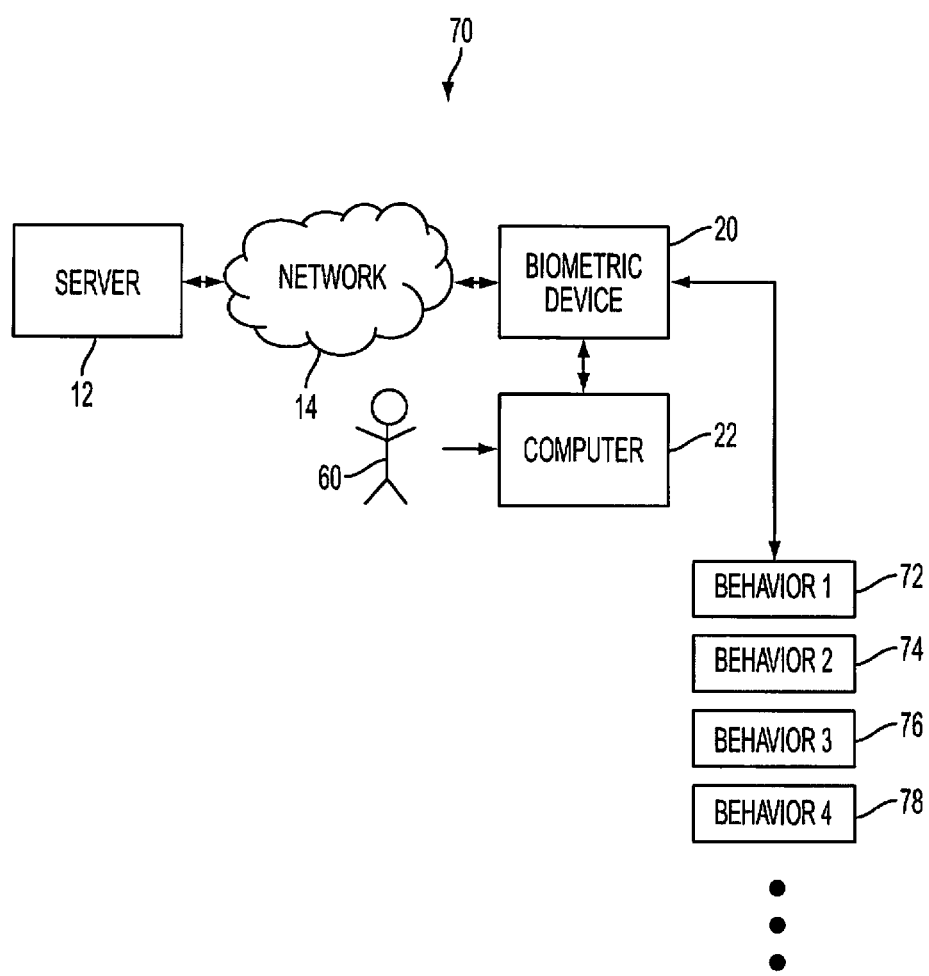
FIG. 5 is a block diagram depicting a system for evaluating the different classes of behaviors of the one or more applications or resources or services, in accordance with the present disclosure.

With reference to FIG. 5, there is presented a block diagram depicting a system for evaluating the different classes of behaviors of the one or more applications or resources, in accordance with the present disclosure. The block diagram 70 includes a server 12, a network 14, a biometric device 20, a computer 22, and a user 60. The biometric device 20 includes a class of behaviors, a first behavior 72, a second behavior 74, a third behavior 76, and a fourth behavior 78.

The server 12 and the network 14 have been described above with reference to FIG. 1.

The class of behaviors 72, 74, 76, 78 may include, but is not limited to: keystroke dynamics, signature verification, mouse movement and trajectory dynamics, speaker verification, GUI selection dynamics, web page navigation dynamics, user response time characteristics, eye focus, content consumption preferences, and the like.

The present disclosure focuses on how to determine whether or not a user is who he claims to be. A behavior such as typing could be a measure or a behavior that is compared to expectations to arrive at a probability measure for the user's identity. The identification taught that while the confidence in any one measure may be low, the observation of a number of behaviors can be combined to yield a robust validation. As a result, the present disclosure proposes a class of behaviors 72, 74, 76, 78 that might be employed to identify a user.

User interfaces have evolved over time and as people have invented different mechanisms for performing some function, the user interface has frequently added the new mechanisms without discarding the old ones. For example, people originally navigated through a document using special "arrow keys", but later when the mouse became standard, the point-and-click method provided an alternative. Similarly, combining certain keys (e.g., shift, ctrl, alt) with other keys could be used as short-cuts to invoke functions. Later menus and mouse clicks where used for the same purpose. To scroll a page, one can press and hold an arrow key, one can "grab" and drag a slider with a mouse, one can click on an up or down button, one might spin a scroll wheel, one might grab and drag an element on the page, as well as some other methods. These are redundant user interface elements and only one approach is actually needed to get the job done, but others are offered for the user's preference and convenience. The present disclosure proposes exploiting such user preferences to provide indicators of identity.

One may consider some operation for which the user interface provides redundant functions. For example to copy some selected content onto the clip board. One can enumerate the redundant function in this example as: (1) use the cntrl-C shortcut key, or (2) select copy form the main edit menu with the mouse, or (3) select copy from the right-click mouse-menu. The system constructs a profile for the user by watching his or her behavior. Thus, the system would determine that user (e.g., John Smith) uses the cntrl-C to copy 70% of the time, the main edit menu 10% and the mouse-menu 20%. When a user claiming to be John Smith uses the system, a similar profile can be captured for the session. The degree to which the session profile matches the Smith profile provides a measure of confidence that the user is indeed Mr. Smith. If, for example, the user claiming to be Smith used cntrl-C 0%, the main edit menu 30% and the mouse menu 70%, then it would raise serious doubts about their identity. Statistical methods such as a chi-square test can be used to determine the goodness of fit between the observed and expected distributions. However, one skilled in the art can envision using any type of statistical methods.

While the statistics for an individual session may be so small as to limit the reliability of any one measure, and more than one individual may share the same profile with respect to a particular operation, every redundant feature of the user interface can be exploited to provide yet another measure. These measures can be combined, along with other behavioral indicators, as suggested in an incremental trust identification to provide a more robust indicator of identity.

Note that once confidence in the user's identity has been achieved (e.g., either through sufficient behavioral measures or by some other means such as a fingerprint) the statistics gathered for a session can be folded back into the user's profile to improve its accuracy.

Figure 6:
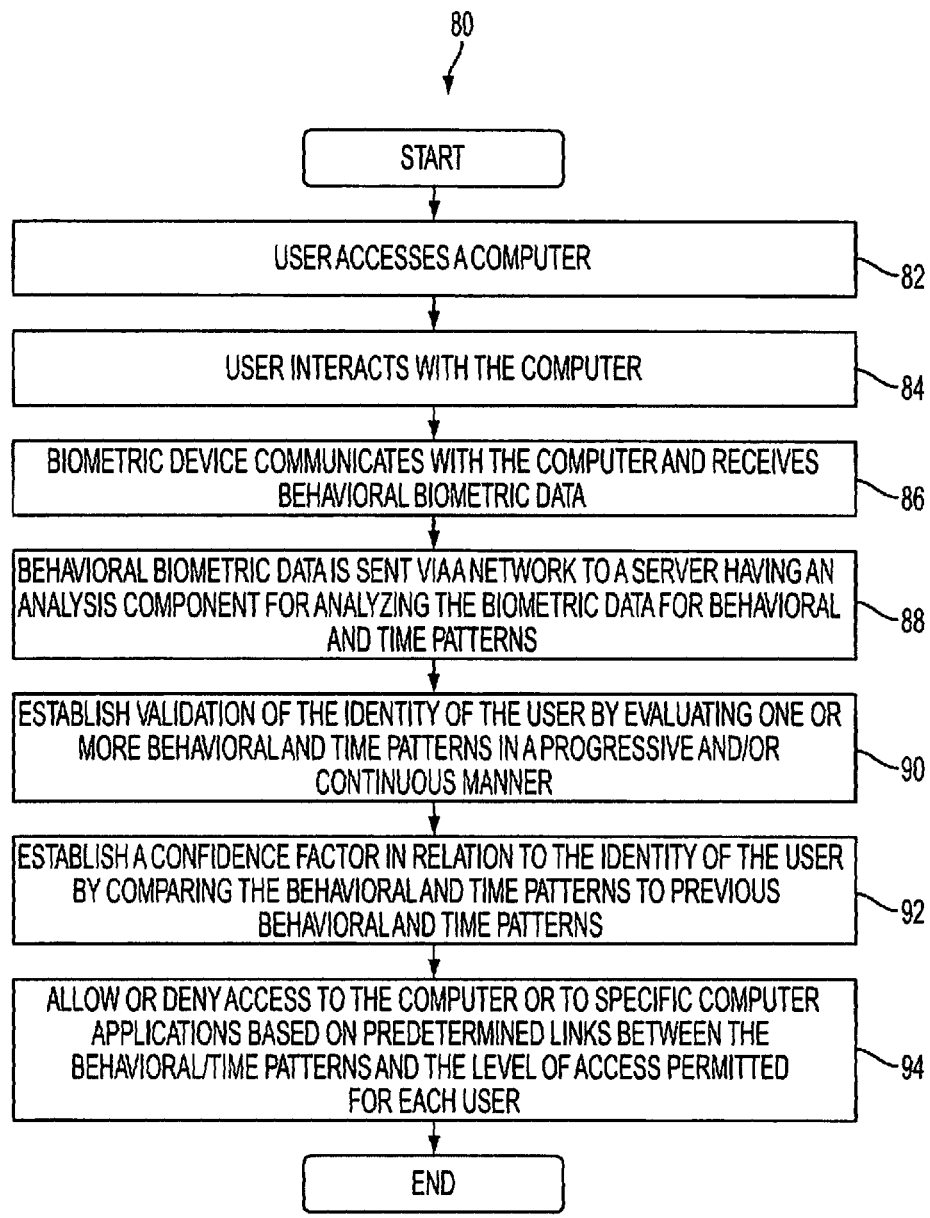
FIG. 6 is a flow chart depicting a method for identification of a user based on behavioral patterns and time patterns, in accordance with the present disclosure.

With reference to FIG. 6, there is presented a flow chart depicting a method for identification of a user based on behavioral patterns and time patterns, in accordance with the present disclosure. The flow chart 80 includes the following steps. In step 82, a user is permitted to access a computer. In step 84, a use is permitted to interact with the computer. In step 86, the biometric device communicates with the computer and receives behavioral biometric data. In step 88, the behavioral biometric data is sent via a network to a server having an analysis component for analyzing the biometric data for behavioral and time patterns. In step 90, the system establishes validation of the identity of the user by evaluating one or more behavioral and time patterns in a progressive and/or continuous manner. In step 92, the system establishes a confidence factor in relation to the identity of the user by comparing the behavioral and time patterns to previous behavioral and time patterns. In step 94, the system allows or denies access to the computer or to specific computer applications based on predetermined links between the behavioral/time patterns and the level of access permitted for each user.

Accordingly, the present disclosure allows for the use of behavioral biometric data in indentifying users, thus minimizing or even eliminating the risk that a hacker or unauthorized user will access certain aspects of the system.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for evaluating identification of a user based on behavioral patterns and time patterns, the system comprising:
an analysis component for analyzing;
an authentication component for authenticating the analyzed data; and
a behavioral biometric device for collecting behavioral biometric data comprising textual style characteristics of raw streams of text generated by the user, the behavioral biometric data related to the user, wherein an identification of the user is not known, the authentication component and the analysis component operably connected at least with the behavioral biometric device;
wherein the behavioral biometric data is matched against previously obtained or expected behavioral biometric data stored in a first database component of the analysis component in order to determine an identification of the user, and to progressively, continuously, and incrementally evaluate the trustworthiness of the user to determine a confidence factor, the trustworthiness corresponding to confidence in the identification of the user,
wherein one or more application features or resources has different security classification levels, each security classification level associated with a level of access to the one or more application features or application resources,
wherein the level of access to one or more application features or application resources for the user is matched to the determined confidence factor,
wherein the confidence factor is progressively, continuously, and incrementally increased or decreased based on a timing pattern received from the behavioral biometric device corresponding to a habitual activity of the user; and
wherein the level of access to the one or more application features or application resources for the user is dynamically increased or decreased responsive to the determined confidence factor.

2. The system according to claim 1, wherein the analysis component and the authentication component are connected to a server and the behavioral biometric device is in operable communication with one or more computing devices in a network configuration.

3. The system according to claim 1, wherein the analysis component includes a parameter monitoring component, a parameter comparing component, a user profile component, and the first database component.

4. The system according to claim 1, wherein the authentication component includes a software security component, an access component, and a second database component.

5. The system according to claim 1, wherein a user profile is created based upon the behavioral biometric data that is matched against the previously obtained or expected behavioral biometric data.

6. The system according to claim 1, uncharacteristic deviations detected from the previously obtained or expected behavioral biometric data stored in the first database component of the analysis component trigger a decrease in the level of access to one or more application features or application resources for the user.

7. The system according to claim 1, wherein the different security classification levels are based on the confidence factor associated with each of the one or more application features or application resources.

8. The system according to claim 7, wherein the confidence factor associated with each of the one or more application features or application resources is established to a degree of probability by the analysis component.

9. The system according to claim 7, wherein the habitual activity corresponds to at least one of a time of day accessing an application or a website, an amount of time accessing an application or a website, or a characteristic order of accessing an application or a website, and wherein the level of access to the one or more application features or application resources for the user correspondingly increases or decreases responsive to the confidence factor.

10. The system according to claim 1, wherein the confidence factor is determined by monitoring (i) a specific class of behaviors and (ii) one or more redundant operations in order to create a user profile.

11. The system according to claim 1, wherein uncharacteristic deviations detected from the previously obtained or expected behavioral biometric data stored in the first database component of the analysis component trigger either (i) an automatic revocation of authentication, (ii) set off an alarm, or (iii) initiate further investigation via a plurality of alternative methods.

12. The system according to claim 1, wherein the behavioral biometric data include one or more of the following: user interface preferences when editing and navigating, file-name patterns, file system browsing habits, web URLs (Uniform Resource Locators) habitually visited, system or software application usage, and keystroke dynamics.

13. The system according to claim 1, wherein the analysis component selectively and empirically chooses desired or suitable behavioral biometric data to evaluate the trustworthiness of the user.

14. A method for evaluating identification of a user based on behavioral patterns and time patterns, the method comprising the steps of:
analyzing data;
authenticating the analyzed data; and
collecting behavioral biometric data comprising textual style characteristics of raw streams of text generated by the user, the behavioral biometric data related to the user, wherein an identification of the user is not known;
wherein the behavioral biometric data is matched against previously obtained or expected behavioral biometric data in order to determine an identification of the user and to progressively, continuously, and incrementally evaluate the trustworthiness of the user to determine a confidence factor, the trustworthiness corresponding to confidence in the identification of the user,
wherein one or more application features or application resources has different security classification levels, each security classification level associated with a level of access to the one or more application features or application resources,
wherein the level of access to one or more application features or application resources for the user is matched to the determined confidence factor,
wherein the confidence factor is progressively, continuously, and incrementally increased or decreased based on a timing pattern received from the behavioral biometric device corresponding to a habitual activity of the user, and
wherein the level of access to the one or more application features or application resources for the user is dynamically increased or decreased responsive to the determined confidence factor.

15. The method according to claim 14, wherein a user profile is created based upon the behavioral biometric data that is matched against the previously obtained or expected behavioral biometric data.

16. The method according to claim 14, wherein uncharacteristic deviations detected from the previously obtained or expected behavioral biometric data stored in the first database component of the analysis component trigger a decrease in the level of access to one or more application features or application resources for the user.

17. The method according to claim 14, wherein the different security classification levels are based on the confidence factor associated with each of the one or more application features or application resources.

18. The method according to claim 17, wherein the confidence factor associated with each of the one or more application features or application resources is established to a degree of probability.

19. The method according to claim 17, wherein the habitual activity corresponds to at least one of a time of day accessing an application or a website, an amount of time accessing an application or a website, or a characteristic order of accessing an application or a website, and wherein the level of access to the one or more application features or application resources for a user correspondingly increases or decreases responsive to the confidence factor.

20. The method according to claim 14, wherein the confidence factor is determined by monitoring (i) a specific class of behaviors and (ii) one or more redundant operations in order to create a user profile.

21. The method according to claim 14, wherein uncharacteristic deviations detected from the previously obtained or expected behavioral biometric data triggers either (i) an automatic revocation of authentication, (ii) set off an alarm, or (iii) initiate further investigation via a plurality of alternative methods.

22. The method according to claim 14, wherein the behavioral biometric data include one or more of the following: user interface preferences when editing and navigating, file-name patterns, file system browsing habits, web URLs (Uniform Resource Locators) habitually visited, system or software application usage, and keystroke dynamics.

23. A computer program product comprising a non-transitory recording medium storing a set of programmable instructions configured for execution by at least one processor for evaluating identification of a user based on behavioral patterns and time patterns, which when executed by the at least one processor, causes the processor to perform the steps of:
analyzing data;
authenticating the analyzed data; and
collecting behavioral biometric data comprising textual style characteristics of raw streams of text generated by the user, the behavioral biometric data related to the user, wherein an identification of the user is not known;
wherein the behavioral biometric data is matched against previously obtained or expected behavioral biometric data in order to determine an identification of the user and to progressively, continuously, and incrementally evaluate the trustworthiness of the user to determine a confidence factor, the trustworthiness corresponding to confidence in the identification of the user,
wherein one or more application features has different security classification levels, each security classification level associated with a level of access to the one or more application features,
wherein the level of access to one or more application features for the user is matched to the determined confidence factor, and
wherein the level of access to the one or more application features for the user is dynamically increased or decreased responsive to the determined confidence factor.

* * * * *